(12) United States Patent
Wissel

(10) Patent No.: US 6,481,312 B1
(45) Date of Patent: Nov. 19, 2002

(54) VENTILATED STEERING WHEEL

(75) Inventor: Willi Wissel, Blankenbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/413,460

(22) Filed: Oct. 6, 1999

(30) Foreign Application Priority Data

Oct. 6, 1998 (DE) ..................................... 298 17 868 U

(51) Int. Cl.$^7$ ................................................. G05G 1/10
(52) U.S. Cl. ....................................................... 74/552
(58) Field of Search ........................................... 74/552

(56) References Cited

U.S. PATENT DOCUMENTS

| | | | | |
|---|---|---|---|---|
| 1,615,635 A | * | 1/1927 | Kuno | 74/552 |
| 2,163,450 A | * | 6/1939 | Preble | 219/204 |
| 3,468,188 A | * | 9/1969 | MacCoon | 74/552 |
| 4,535,221 A | * | 8/1985 | Holsworth | 219/204 |
| 4,920,822 A | * | 5/1990 | Abiko | 74/552 |
| 5,573,606 A | * | 11/1996 | Evans et al. | 148/440 |
| 6,298,750 B1 | * | 10/2001 | Kerner et al. | 74/552 |

FOREIGN PATENT DOCUMENTS

| | | |
|---|---|---|
| DE | 7149043 | 12/1971 |
| DE | 9111356 | 2/1992 |
| DE | 29515265 | 2/1996 |
| EP | 0849127 | 6/1998 |
| EP | 0989045 | 3/2000 |
| FR | 2364801 | 4/1978 |
| JP | 62128879 | 6/1987 |

* cited by examiner

Primary Examiner—David A. Bucci
Assistant Examiner—Vicky A. Johnson
(74) Attorney, Agent, or Firm—Tarolli, Sundheim, Covell, Tummino & Szabo L.L.P.

(57) ABSTRACT

A steering wheel for a vehicle comprises a wheel skeleton with a hub, a plurality of spokes and a wheel body. The spokes interconnect the hub and the wheel body. A cover surrounds at least the wheel body and part of the spokes of the skeleton. The cover is assembled of a pair of complementary shells to define a wheel rim. An air duct is defined between the shells. The shells have multiple air outlet openings distributed in a circumferential direction and communicating with the air duct. The shells further define at least one air intake port communicating with the air duct. Alternatively, one of the shells is integral with and actually formed by the wheel body.

6 Claims, 6 Drawing Sheets

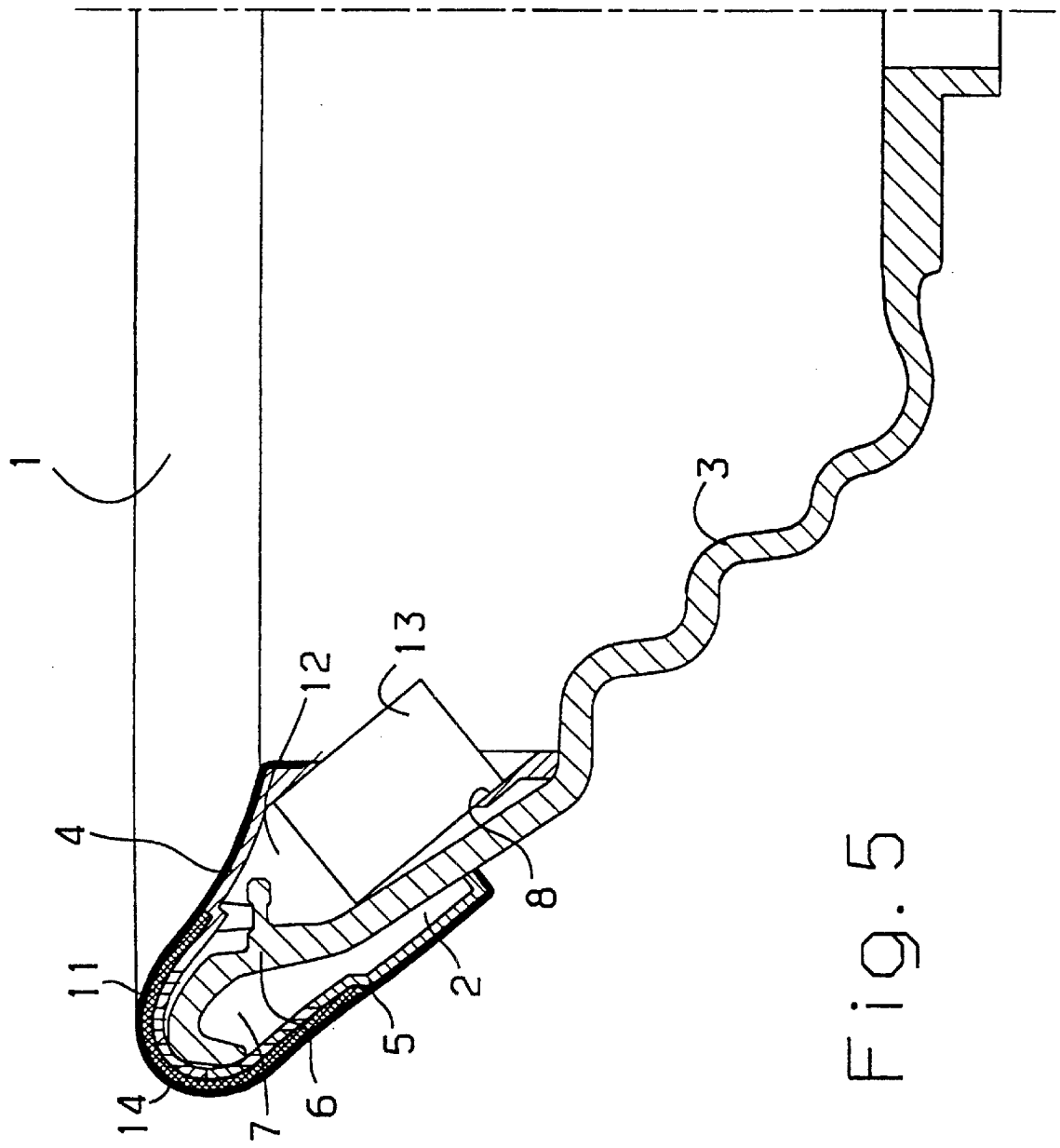

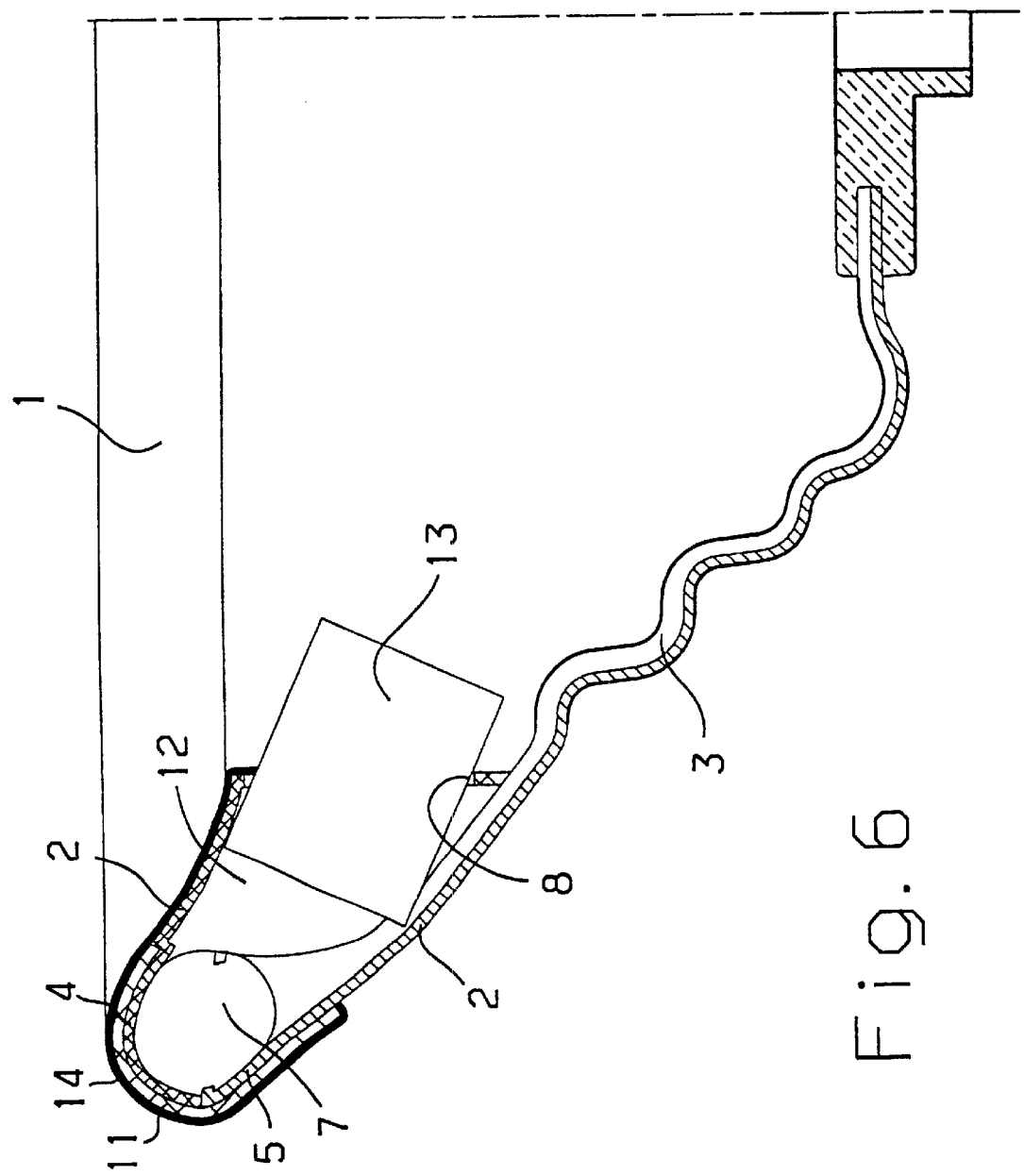

VENTILATED STEERING WHEEL

The present invention relates to a steering wheel for vehicles.

Known from DE 21 64 976 Al is a steering wheel incorporating means for heating or cooling the steering wheel rim in which, via a channeling system configured in the steering wheel and in the steering column, air from a heating/cooling air source existing in the vehicle is guided into the region of the steering wheel rim and steering wheel spokes, the air being expelled via a plurality of ports. The connection of the air guidance system in the steering wheel and in the steering column to the heating/cooling air source of the vehicle is achieved via a two-way valve. This known means for heating or cooling the steering wheel is relatively complicated, depends on the vehicular heating or cooling sources and restricts freedom of design especially in the region of the steering wheel because a full-length channeling system needs to be provided with a lower groove peripherally in the steering wheel rim to enable the air to be distributed as evenly as possible. In addition to this, it is not evident from DE 21 64 976 Al whether or how a mechanically supporting skeleton may be simultaneously achieved with the air guidance system in the steering wheel rim and steering wheel spokes.

Known from German utility model 9204354 is a motor vehicle steering means in which the actual steering wheel comprises a supporting body having a sheathing with a good hand and is connected to a steering tube. Provided in the region of the supporting body is a temperature control means affecting the sheathing and receiving its energy via the steering tube. In accordance with one embodiment temperature control of the steering wheel is intended to occur via the steering tube by the air-conditioning or ventilation system of the vehicle. For this purpose ventilation holes are provided in the steering wheel which are connected via the steering tube to the ventilation or air-conditioning system of the vehicle. Where this steering means is intended to be temperature-controlled by means of heating or cooling air it has the same drawbacks as those of the means known from DE 21 64 976 Al. There is no evidence from German utility design 9204354 as to how the supporting means and the sheathing in such temperature-controlled steering wheels are to be designed and how the necessary air guidance system may be integrated in the steering wheel.

The present invention provides a steering wheel with an air guidance system, more particularly in the region of the steering wheel rim to enable an effective air distribution to be achieved without having to put up with the drawbacks as regards the remaining functions of the steering wheel. The ventilated steering wheel can be produced on typical steering wheel production lines without any appreciable increase in cost.

In accordance with the invention, the steering wheel rim is formed by two half-shells connected to each other at their edges and are fixed to the supporting skeleton of the steering wheel to define an air duct connected to at least one air intake port multiple air outlet ports being formed in the half-shells.

This is based on the consideration that for an even and energy-saving distribution of an air flow serving ventilation an air duct need to be provided which is as short as possible and has a flow cross-section as large as possible. When the air duct in accordance with the invention is formed by two half-shells the maximum possible flow cross-section is achievable in the region of the steering wheel rim whilst achieving a styling which may be optimally adapted to other important steering wheel functions.

The half-shells may be connected to each other with an interlocking fit and/or by frictional connection and provided with ergonomically formed recessed grips. Together with the steering wheel skeleton all requirements as regards strength and accident safety may be optimally satisfied without making production complicated or more expensive.

Further details will now be described with reference to the example embodiments as shown in FIGS. 1 to 6 in which FIG. 1 is an exploded view of a first embodiment of the gist of the invention;

FIG. 5 is a section view of an embodiment as shown in FIGS. 1 and 2;

FIG. 6 is a section view of an embodiment as shown in FIGS. 3 and 4.

Figure 1:
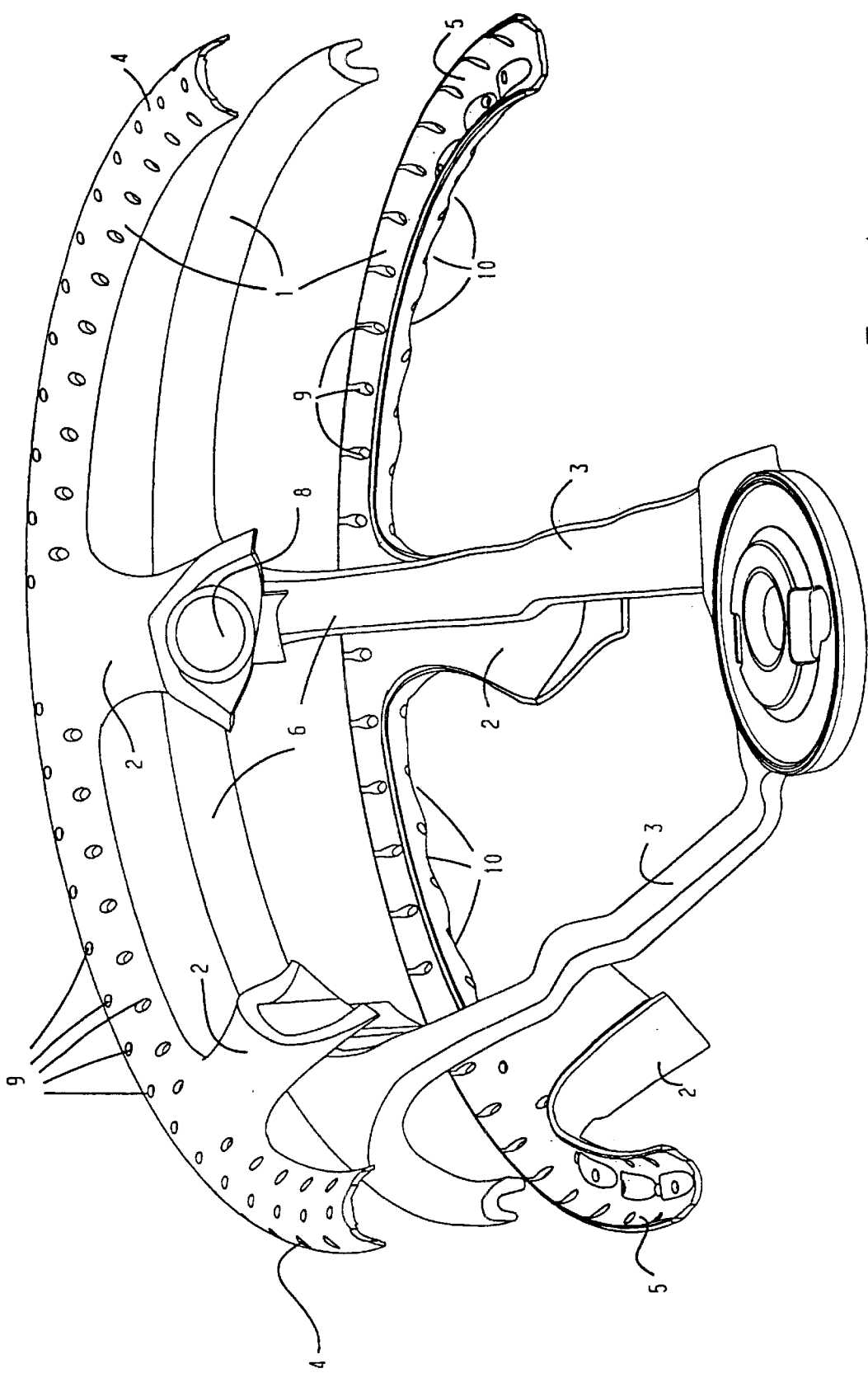

In FIGS. 1 to 6 the reference numerals 1 to 13 identify the following components:

Referring now to FIG. 1 there is illustrated a steering wheel wherein the steering wheel rim 1 has transition portions 2 to steering wheel spokes 3. The steering wheel rim 1 is assembled from a pair of shell members, an upper half-shell 4 and a lower half-shell 5 which together with a steering wheel skeleton 6 form mechanical supporting parts of the steering wheel whilst defining an air duct 7 via which air introduced through an air intake port 8 may be passed on to many air outlet ports 9 and emitted therefrom. In this arrangement the two half-shells 4 and 5 are configured so that may be connected to each other at the edges and secured to the supporting skeleton in a manner spaced therefrom by an internal spacing structure. The transition portions between the spokes and the rim are configured so that they may accommodate at least one air intake port 8 and are adapted in cross-section to the expanded sheathing of the steering wheel spokes as is usually provided. Styling the half-shells is done otherwise with reference to the various steering wheel functions, ergonomically configured recessed grips 10 also being provided, especially in the region of the lower half-shell 5.

Figure 2:
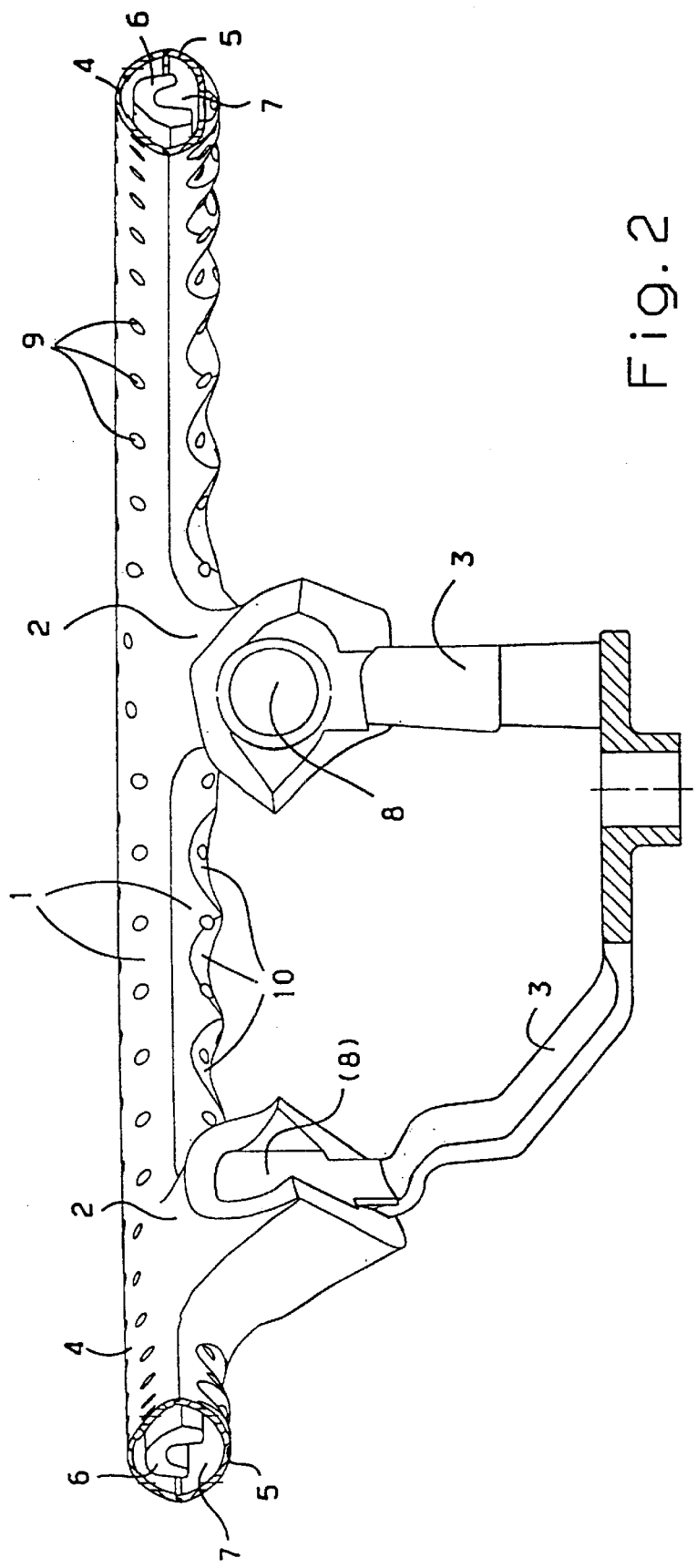
FIG. 2 is a composite view of the embodiment as shown in FIG. 1.

Referring now to FIG. 2 there is illustrated the composed half-shells 4 and 5 encompassing the skeleton of the steering wheel and forming an air duct 7 comprising at least one air intake port 8. Indicated at the spoke 3 shown on the left in the Figure is a closure identified (8) by means of which the air duct 7 is closed off in the transition portions 2 relative to the steering wheel spokes 3 in which no air intake port 8 is provided. The remaining reference numerals have the same meaning as in FIG. 1 and thus require no further explanation.

Figure 3:
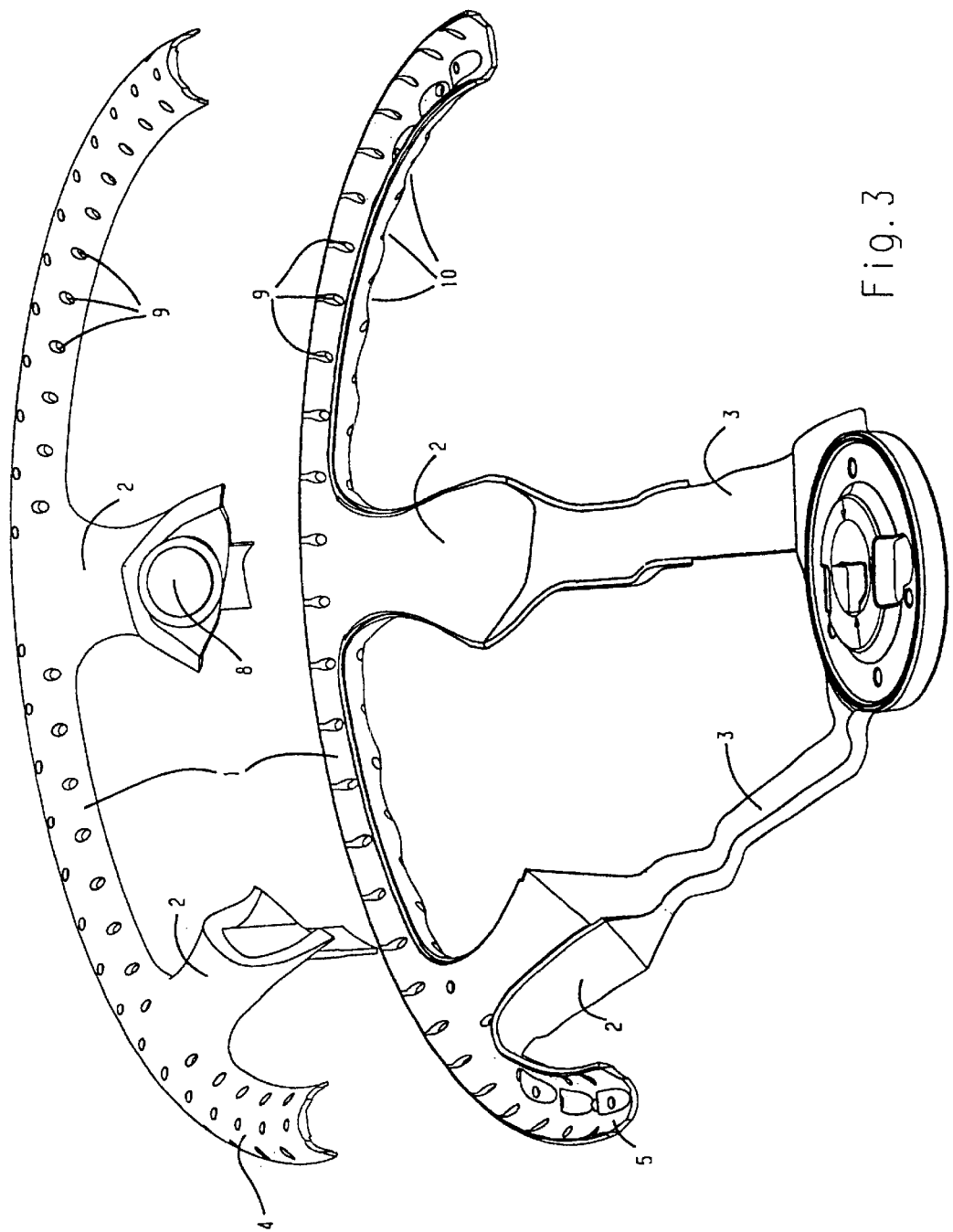
FIG. 3 is an exploded view of a second embodiment of the gist of the invention.

Referring now to FIG. 3 there is illustrated an embodiment of the invention in which the lower half-shell 5 is produced with transition portions 2 and steering wheel spokes 3 in one piece from a suitable light metal alloy by die-casting. The upper half-shell 4 may likewise consist of a die-cast light metal alloy or of an injection-molded thermoplastic material. The styling of the upper half-shell 4 is no different from that as shown in FIGS. 1 and 2. The styling of the lower half-shell 5 with its ergonomically configured recessed grips 10 too, is no different from that as shown in FIGS. 1 and 2. In such an embodiment a separate supporting skeleton 6 is, of course, eliminated in the rim region because to this end all mechanical functions may be taken over by the half-shells 4 and 5 connected to each other by their edges in conjunction with the spokes 3 formed in one piece, the air intake port 8 and the air outlet ports 9 also being configured accordingly as shown in FIGS. 1 and 2.

Referring now to the section view as shown in FIG. 5 there is illustrated how a fan 13 is inserted in the air intake port 8 of the upper half-shell 4. In the transition portion 2 from the steering wheel rim 1 to the steering wheel spokes 3 the half-shells 4 and 5 form an integrated air supply channel 12 which translates into the air duct. The half-shells 4 and 5 encompass the skeleton 6 and are supported thereby or by the spokes 3 belonging to the skeleton such that they form with the steering wheel skeleton a mechanical unit satisfying all demands on the steering wheel as anticipated in vehicle operation. The half-shells 4 and 5 are clad with an air-permeable fabric 11 which is covered on the outside by a typical steering wheel sheathing 14 of plastics, leather or the like. This sheathing, like the fabric 11, is air-permeable.

Figure 4:
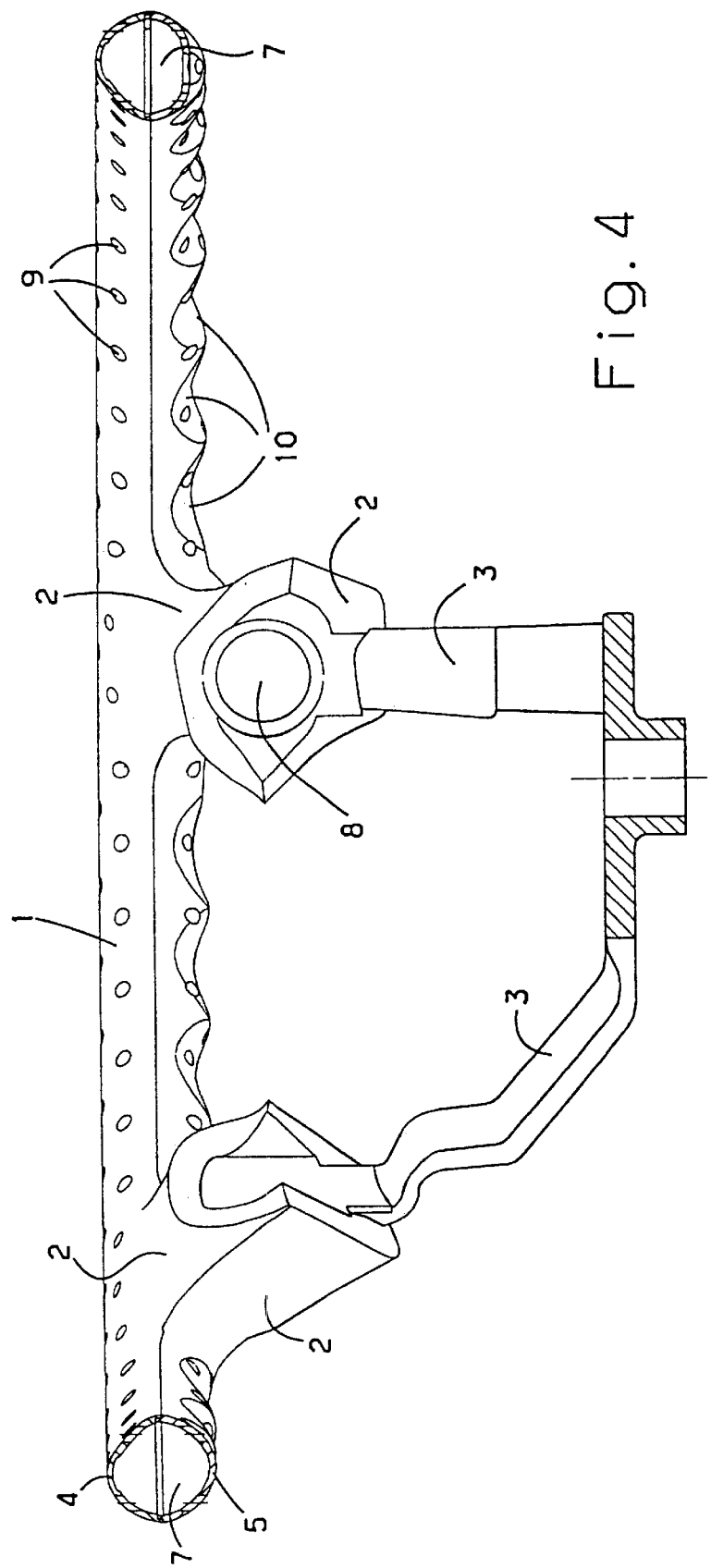
FIG. 4 is a composite view of the embodiment as shown in FIG. 3.

Referring now to FIG. 6 there is illustrated how a fan 13 is accommodated in the transition portion 2 between steering wheel rim 1 and the spokes 3 of the upper half-shell 4 in an embodiment as shown in FIGS. 3 and 4 in which the lower half-shell 5 is configured in one piece with a steering wheel skeleton 6 of die-cast light metal alloy. As an alternative the lower half-shell 4 may also be configured in one piece with a steering wheel skeleton made of sheet metal on which a hub portion is formed by casting.

As evident from the embodiment as shown in FIG. 5 the fan 13 is adjoined by an air supply channel 12 which translates into the air duct 7. The half-shells 4 and 5 are clad with an air-permeable fabric 11 which is covered on the outside by a typical steering wheel sheathing 14 of plastics, leather or the like.

The embodiments as evident from FIGS. 5 and 6 have the advantage that only a short air channeling system is needed, thus enabling flow losses to be minimized. Depending on the air flow required either only a single air intake port 8 with a single fan 13 is provided and all other transition portions 2 from the steering wheel rim 1 to the steering wheel spokes 3 are closed off, or should the air flow with a single fan 13 not be sufficient, two or more fans 13 may be provided. Where installation space availability permits, a central fan may also be provided and accommodated in the hub of the steering wheel, the necessary flow of air into the air duct 7 being then introduced via one or more air supply channels arranged along the steering wheel spokes. The only substantial point here is to provide, encompassing the steering wheel rim 1 and the transition portions 2 to the steering wheel spokes 3, two half-shells 4, 5 connected to each other at the edges and constituting the air duct 7.

What is claimed is:

1. A steering wheel for a vehicle, comprising a wheel skeleton with a hub, a plurality of spokes and a concave wheel shell, said spokes interconnecting said hub and said wheel shell, and further comprising a convex cover shell complementary to and assembled with said wheel shell to define a wheel rim, an air duct being defined between said shells, said shells having multiple air outlet openings distributed in a circumferential direction and communicating with said air duct, said shells further defining at least one air intake port communicating with said air duct, and said shells being externally covered with an air permeable skin selected from the group consisting of textile fabric, finely perforated leather and finely perforated plastics.

2. A steering wheel for a vehicle, comprising a wheel skeleton with a hub, a plurality of spokes and a wheel body, said spokes interconnecting said hub and said wheel body, comprising a cover surrounding at least the wheel body and part of said spokes of said skeleton, said cover being assembled of a pair of complementary shells to define a wheel rim, an air duct being defined between said shells, said shells having multiple air outlet openings distributed in a circumferential direction and communicating with said air duct, said shells further defining at least one air intake port communicating with said air duct, and said steering wheel further comprising a fan unit accommodated within said hub and having an air discharge, said air intake port communicating with said air discharge.

3. A steering wheel for a vehicle, comprising a wheel skeleton with a hub, a plurality of spokes and a wheel body, said spokes interconnecting said hub and said wheel body, comprising a cover surrounding at least the wheel body and part of said spokes of said skeleton, said cover being assembled of a pair of complementary shells to define a wheel rim, an air duct being defined between said shells, said shells having multiple air outlet openings distributed in a circumferential direction and communicating with said air duct, said shells further defining at least one air intake port communicating with said air duct, and said steering wheel further comprising at least one fan unit associated with one of said spokes and having an air discharge, said air intake port communicating with said air discharge.

4. A steering wheel for a vehicle, comprising a wheel skeleton with a hub, a plurality of spokes and a concave wheel shell, said spokes interconnecting said hub and said wheel shell, comprising a convex cover shell complementary to and assembled with said wheel shell to define a wheel rim, an air duct being defined between said shells, said shells having multiple air outlet openings distributed in a circumferential direction and communicating with said air duct, said shells further defining at least one air intake port communicating with said air duct, and said steering wheel further comprising a fan unit accommodated within said hub and having an air discharge, said air intake port communicating with said air discharge.

5. A steering wheel for a vehicle, comprising a wheel skeleton with a hub, a plurality of spokes and a concave wheel shell, said spokes interconnecting said hub and said wheel shell, comprising a convex cover shell complementary to and assembled with said wheel shell to define a wheel rim, an air duct being defined between said shells, said shells having multiple air outlet openings distributed in a circumferential direction and communicating with said air duct, said shells further defining at least one air intake port communicating with said air duct, and said steering wheel further comprising at least one fan unit associated with one of said spokes and having an air discharge, said air intake port communicating with said air discharge.

6. The steering wheel as set forth in claim 1 wherein said skeleton is metal die-cast and said cover shell is molded of a plastic material.

* * * * *

UNITED STATES PATENT AND TRADEMARK OFFICE
CERTIFICATE OF CORRECTION

PATENT NO.    : 6,481,312 B1
DATED         : November 19, 2002
INVENTOR(S)   : Willi Wissel It is certified that error appears in the above-identified patent and that said Letters Patent is hereby corrected as shown below:

Title page,
Item [73], Assignee, after "Aschaffenburg (DE)" insert, -- DaimlerChrysler AG, Stuttgart (DE) --.

Signed and Sealed this

Twenty-second Day of March, 2005

JON W. DUDAS
*Director of the United States Patent and Trademark Office*